(12) United States Patent
Kim

(10) Patent No.: US 8,191,200 B2
(45) Date of Patent: Jun. 5, 2012

(54) WIPER BLADE

(75) Inventor: In Kyu Kim, Ansan-si (KR)

(73) Assignees: ADM21 Co., Ltd., Gyeonggi-do (KR); In Kyu Kim, Gyeonggi-do (KR)

( * ) Notice: Subject to any disclaimer, the term of this patent is extended or adjusted under 35 U.S.C. 154(b) by 1111 days.

(21) Appl. No.: 12/005,173

(22) Filed: Dec. 20, 2007

(65) Prior Publication Data

US 2008/0289133 A1 Nov. 27, 2008

(30) Foreign Application Priority Data

May 21, 2007 (KR) .................. 10-2007-0049170
May 30, 2007 (KR) .................. 10-2007-0052518

(51) Int. Cl.
*B60S 1/40* (2006.01)
*B60S 1/38* (2006.01)

(52) U.S. Cl. ............... 15/250.32; 15/250.43; 15/250.201

(58) Field of Classification Search ............... 15/250.43, 15/250.44, 250.361, 250.201, 250.32
See application file for complete search history.

(56) References Cited

U.S. PATENT DOCUMENTS

| | | | |
|---|---|---|---|
| 5,746,534 A | 5/1998 | Hara | 403/133 |
| 5,885,023 A | 3/1999 | Witek et al. | 403/321 |
| 5,920,950 A | 7/1999 | Young, III et al. | 15/250.32 |
| 6,779,223 B1 | 8/2004 | Roekens | 15/250.32 |
| 7,587,783 B1 * | 9/2009 | Lin | 15/250.43 |
| 7,908,703 B2 * | 3/2011 | Van Bealen | 15/250.32 |
| 2002/0174505 A1 | 11/2002 | Kim | 15/250.32 |
| 2004/0123414 A1 | 7/2004 | Lee | 15/250.32 |
| 2005/0028312 A1 | 2/2005 | Coughlin | 15/250.32 |
| 2006/0026786 A1 * | 2/2006 | Ku | 15/250.32 |
| 2006/0059647 A1 * | 3/2006 | Ostrowski | 15/250.32 |
| 2006/0115325 A1 * | 6/2006 | Thienard | 403/329 |
| 2006/0191093 A1 | 8/2006 | Boland et al. | 15/250.32 |
| 2007/0061994 A1 * | 3/2007 | Lee | 15/250.201 |
| 2007/0094833 A1 * | 5/2007 | Poton | 15/250.32 |
| 2007/0220698 A1 * | 9/2007 | Huang | 15/250.32 |

FOREIGN PATENT DOCUMENTS

| | | | |
|---|---|---|---|
| DE | 10259670 | * | 7/2004 |
| DE | 10349637 A1 | | 6/2005 |
| EP | 0 528 307 A1 | | 2/1993 |
| EP | 1795406 A1 | | 6/2007 |
| FR | 2 731 191 A1 | | 9/1996 |
| FR | 2 848 955 A1 | | 6/2004 |
| GB | 2 324 463 A | | 10/1998 |
| JP | 10-181540 A | | 7/1998 |
| KR | 20-2003-0021115 U | | 7/2003 |
| KR | 10-2006-0134912 A | | 12/2006 |
| KR | 20-2008-003851 U | | 9/2008 |
| WO | WO2005/102802 | * | 11/2005 |
| WO | 2006069648 A1 | | 7/2006 |

* cited by examiner

Primary Examiner — Gary Graham
(74) Attorney, Agent, or Firm — Seed IP Law Group PLLC

(57) ABSTRACT

Disclosed herein is a wiper blade coupled to or configured to be coupled to a wiper arm of a vehicle to wipe a glass surface of a windshield. The wiper blade includes a wiper strip configured to contact the glass surface, a frame coupled to the wiper strip, a bracket disposed at a center of the frame and joined to the wiper arm, and a joint disposed between the frame and the bracket to secure the bracket to the frame.

19 Claims, 11 Drawing Sheets

WIPER BLADE

BACKGROUND

1. Technical Field

The present invention relates to a wiper blade coupled to a wiper device for wiping a windscreen of vehicles, and more particularly to a wiper blade that has improved coupling structure between respective components of the wiper blade to ensure easy assembly of the wiper blade and to allow various kinds of wiper arm to be coupled thereto.

2. Description of the Related Art

Referring to FIG. 1, a conventional wiper device includes a wiper arm 9 pivoted in right and left directions by a motor (not shown) disposed in a vehicle, and a wiper blade 1 coupled to the wiper arm 9 to move therewith. The wiper blade 1 is provided with a wiper strip 2 that wipes a glass surface of a windshield (not shown) of the vehicle while reciprocally moving across the windshield in a closely contacting state.

The wiper blade 1 is coupled to the wiper arm 9 and pivoted at a predetermined angle by operation of the motor. Conventionally, the wiper blade 1 includes a first link member 3 joined to the wiper arm 9, a plurality of second link members 5 joined to the first link member 3 to evenly deliver pressure of the wiper arm 9, and a plurality of third link members 7 respectively joined to the second link members 5 to connect the second link members 5 to the wiper strip 2.

Clips 5a and 7a are respectively provided to distal ends of the second and third link members 5 and 7 disposed near the wiper strip 2, and are fitted into a rail groove of the wiper strip 2 to join the wiper strip 2 to the second and third link members 5 and 7.

As such, the conventional wiper blade 1 includes the plural link members 3, 5 and 7, which are coupled to one another to pivot at predetermined angles, so that the wiper strip 2 is smoothly rounded along the contour of the windshield.

However, since the plural link members 3, 5 and 7 of the conventional wiper blade are pivotably coupled to one another as described above, there are disadvantages such as noise generation at coupled positions between the link members, corrosion resulting from paint strip-off, and the like.

In addition, the wiper blade is an expendable article to be replaced with new one when the wiper strip made of rubber is worn out or when the wiper stripe decreases in contact or wiping force. Typically, the wiper blade with an adapter coupled thereto is sold in the market, and a user is demanded to replace the whole wiper blade including the adapter with new one when replacing the wiper blade.

However, since wiper arms have different shapes according to a kind of vehicle, adapters to be coupled to the wiper arms must have different shapes and sizes due to the different shapes and sizes of the wiper arms. Thus, it is necessary to manufacture or possess the adapters corresponding to the shapes and size of the wiper arms when manufacturing the wiper blade.

Further, the conventional wiper blade has a complicated configuration for securing the wiper strip, causing a complicated process that requires extended time and time for assembly while reducing productivity.

Moreover, the conventional wiper blade suffers from reduction in contact force with the glass surface of the windshield due to detachment of the wiper blade from the glass surface by wind when the vehicle runs on the road at high speeds.

BRIEF SUMMARY

In one embodiment, a wiper blade is provided that has improved coupling structure between respective components of the wiper blade to ensure easy assembly of the wiper blade and to allow various kinds of wiper arm to be coupled thereto.

In accordance with one aspect of the present invention, the above and other objects can be accomplished by the provision of a wiper blade coupled to a wiper arm of a vehicle to wipe a glass surface of a windshield, including a wiper strip contacting the glass surface to wipe the glass surface; a frame coupled to the wiper strip; a bracket disposed at a center of the frame and joined to the wiper arm; and a joint disposed between the frame and the bracket to secure the bracket to the frame.

The wiper blade may further include a cover slidably and pivotably provided to the bracket.

The wiper blade may further include right and left spoilers respectively coupled to right and left sides of the frame centered on the bracket to prevent the wiper blade from being detached from the glass surface when the vehicle travels.

The wiper arm joined to the bracket may be one selected from a hook type wiper arm and a side-pin type wiper arm.

The wiper blade may further include a secondary adapter coupled to the bracket to be connected to the wiper arm, wherein the wiper arm connected to the secondary adapter is a pin type wiper arm.

BRIEF DESCRIPTION OF THE SEVERAL VIEWS OF THE DRAWINGS

The above and other objects, features and advantages of the present invention will become apparent from the following description of preferred embodiments given in conjunction with the accompanying drawings, in which.

DETAILED DESCRIPTION

Exemplary embodiments of the present invention will be described in detail with reference to the accompanying drawings hereinafter.

Figure 2:
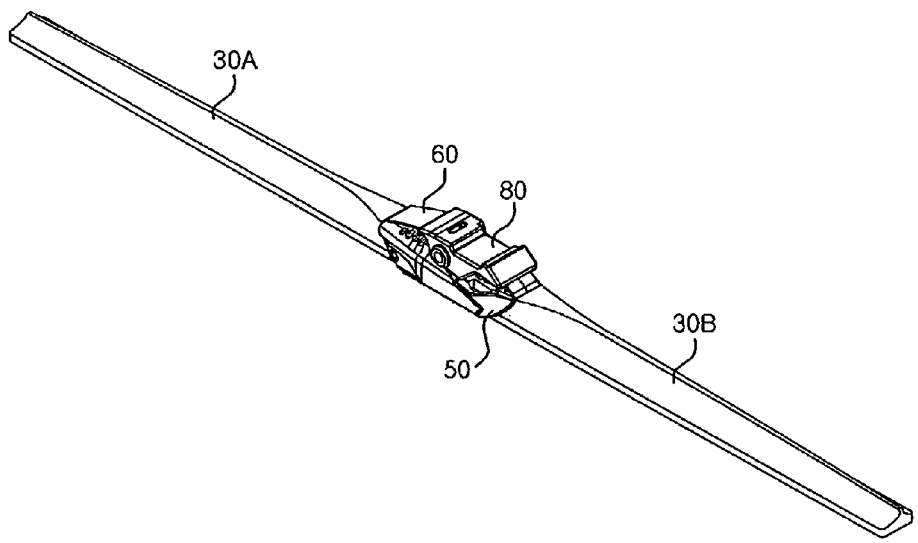
FIG. 2 is a perspective view of a wiper blade according to one embodiment.
Figure 3:
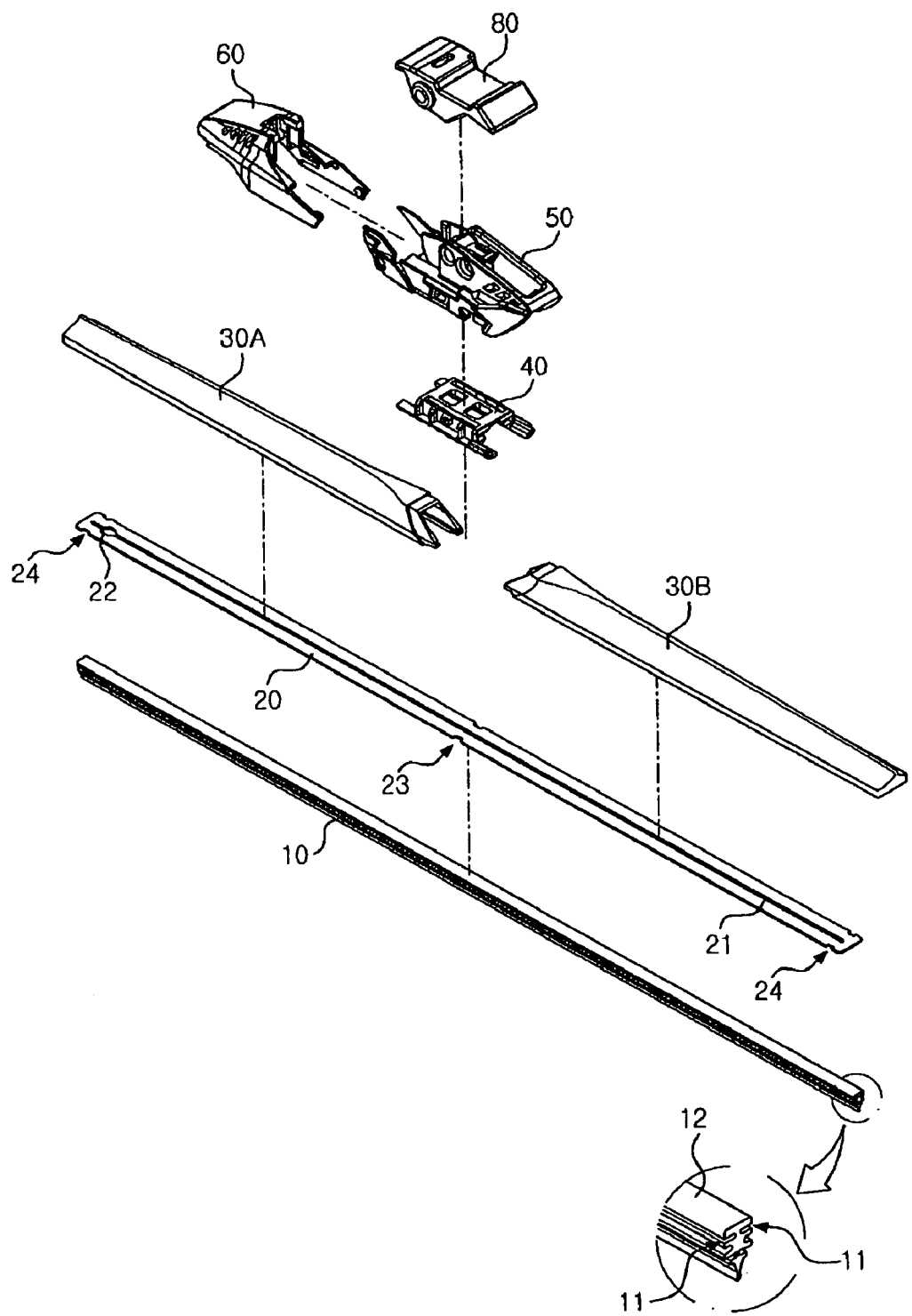
FIG. 3 is an exploded perspective view of the wiper blade of FIG. 2.

FIG. 2 is a perspective view of a wiper blade according to one embodiment, and FIG. 3 is an exploded perspective view of the wiper blade of FIG. 2.

Referring to FIGS. 2 and 3, a wiper blade according to one embodiment includes a wiper strip 10 contacting a glass surface of a vehicle to wipe the glass surface while pivoting across the glass surface, a frame 20 coupled to the wiper strip 10, and a bracket 50 disposed at a center of the frame 20 to couple the wiper blade to a wiper arm (not shown).

According to one embodiment, the wiper blade may further include a joint 40 disposed between the frame 20 and the bracket 50 to secure the bracket 50 and the frame 20, and a cover 60 slidably and pivotably provided to the bracket 50.

Left and right spoilers 30A and 30B may be respectively coupled to right and left sides of the frame 20 centered on the bracket 50 to prevent the wiper blade from being detached from the glass surface when the vehicle runs on the road.

According to one embodiment, the wiper blade may further include a secondary adapter 80 capable of being joined to the bracket 50 to permit connection of another kind of wiper arm (not shown) which is different from the wiper arm (not shown) capable of being joined to the bracket 50.

As such, the wiper blade according to the present invention can be prepared by assembling the respective components without a separate post-process, reducing cost and time needed for manufacture of the wiper blade while improving productivity.

FIG. 2 shows the wiper blade with the secondary adapter 80 assembled thereto. In this regard, although the wiper strip 10, frame 20, and left and right spoilers 30A and 30B are commonly shown as having a linear shape, these components can have a curved shape.

Figure 1:
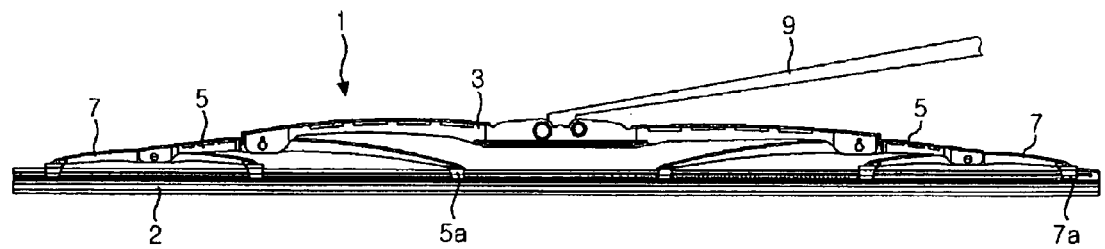
FIG. 1 is a front view of a conventional wiper blade.

In some embodiments, the wiper strip 10 may have the same configuration as that of the conventional wiper strip 10 shown in FIG. 1, and includes a pair of rail grooves 11 that are formed along right and left sides of the wiper strip 10 in the longitudinal direction, as shown in FIG. 3.

In the meantime, the conventional wiper strip includes an elongated reinforcing iron core (not shown) inserted into each of the rail grooves to maintain the shape of the wiper strip made of rubber while ensuring coupling to the plural link members 3, 5 and 7 (see FIG. 1). However, according to embodiments, since the frame 20 can provide functions of the link members 3, 5 and 7 (see FIG. 1) and the reinforcing iron core of the conventional wiper blade, the reinforcing iron core of the conventional wiper blade is not required for the wiper blade of embodiments of the present invention.

Figure 4:
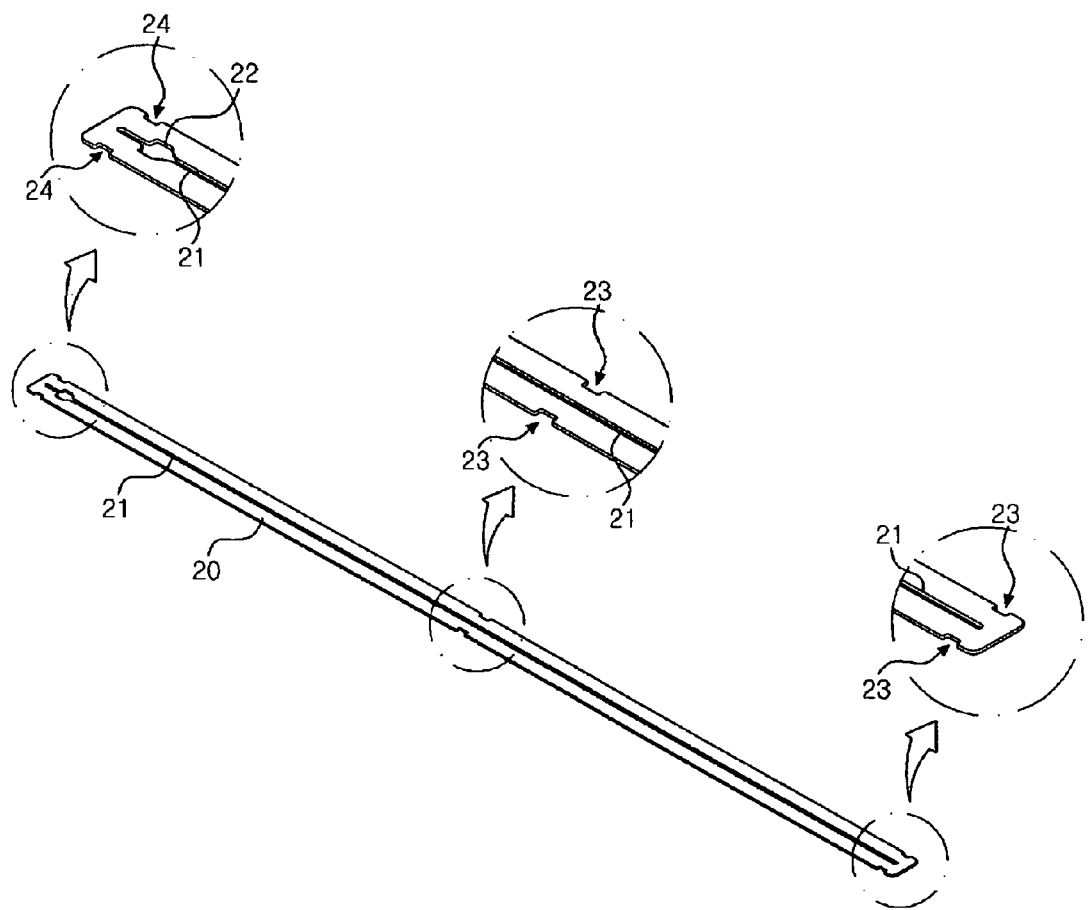
FIG. 4 is a perspective view of a frame of the wiper blade of FIG. 2 according to one embodiment.

FIG. 4 shows the frame 20 of the wiper blade according to one embodiment.

The frame 20 compresses the wiper strip 10 with respect to the glass surface at a constant resilient force such that the wiper strip 10 can be brought into close contact with the glass surface. For this purpose, the frame 20 is made of an elongated metal plate and has a curved shape with several radii of curvature.

Referring to FIG. 4, the frame 20 is formed with a slit 21 extending in a longitudinal direction thereof. The wiper strip 10 can be mounted on the frame 20 by inserting the rail grooves 11 of the wiper strip 10 into the slit 21.

Further, the slit 21 is formed at one end with an insertion hole 22, through which an upper end 12 of the wiper strip 10 passes to permit the rail grooves 11 of the wiper strip 21 to be inserted into the slit 21.

The frame 20 may have a single slit 21 and a single insertion hole 22, as shown in FIG. 4. Alternatively, although not shown in the drawings, the frame 20 may have two or more insertion slits 21 along with two or more insertion holes 22. On the other hand, the upper end 12 of the wiper strip 10 is shaped corresponding to the number of slits 21 and insertion holes 22. For example, as shown in FIGS. 3 and 4, when the frame 20 includes the single slit 21 and the single insertion hole 22, the upper end 12 of the wiper strip 10 constitutes a single flat surface in the longitudinal direction without being divided into two sections.

Referring to the detailed views provided in the dashed enlarged circles of FIG. 4, the frame 20 has a pair of first depressions 23 formed on an outer periphery at a center of the frame 20 to maintain coupling between the frame 20 and the bracket 50 (FIG. 3) as described below, and a pair of second depressions 24 formed on an outer periphery at opposite sides of the frame 20 to maintain coupling between the frame 20 and the left and right spoilers 30A and 30B (FIG. 3) as described below.

Figure 5:
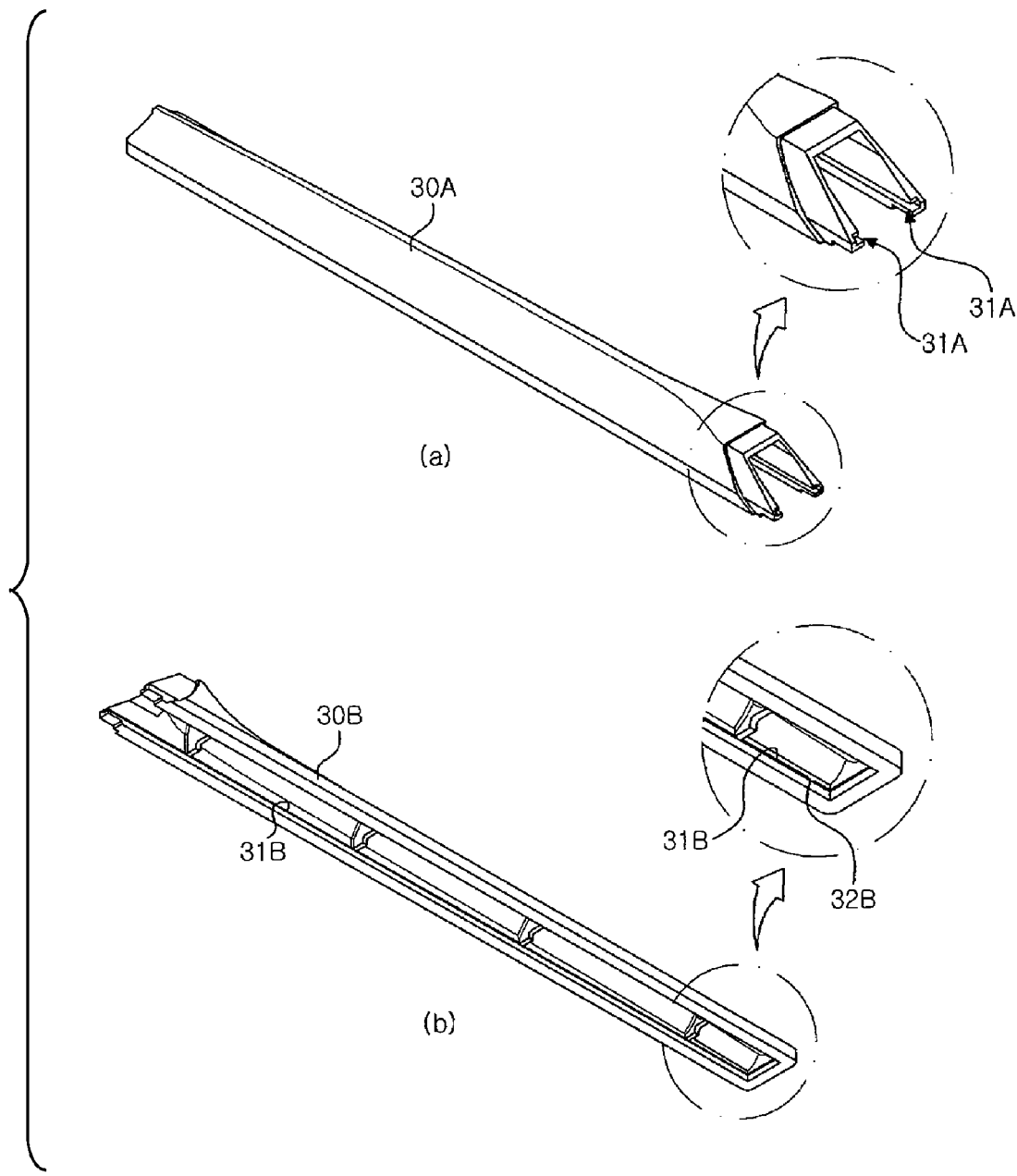
FIG. 5 illustrates spoilers of the wiper blade of FIG. 2 according to one embodiment, wherein (a) is a perspective view of a left spoiler seen from above, and (b) is a perspective view of a right spoiler seen from below.

FIG. 5 illustrates the spoilers 30A and 30B of the wiper blade according to one embodiment, wherein (a) is a perspective view of the left spoiler. 30A seen from above, and (b) is a perspective view of the right spoiler 30B seen from below.

The left and right spoilers 30A and 30B are made of rubber or soft plastic materials, and have inclined surfaces to prevent the wiper blade from being detached from the window glass of the windshield even when the vehicle travels at high speeds.

Referring to the detailed views provided in the dashed enlarged circles of FIGS. 5(a) and 5(b), the spoilers 30A and 30B have respective first fitting grooves 31A and 31B formed on opposite inner lower sides, such that the outer periphery of the frame 20 is inserted into the first fitting grooves 31A and 31B to allow the frame 20 to be assembled to the left and right spoilers 30A and 30B.

Further, referring to the detail view provided in the enlarged circle of FIG. 5(b), each of the first fitting grooves 31A and 31B is formed at one end with a coupling maintenance protuberance 32B that can be inserted into the second depression 24 of the frame 20. Since the left spoiler 30A is symmetrically disposed with respect to the right spoiler 30B, the left spoiler 30A includes coupling maintenance protuberances formed at the same location and with the same shape as those of the right spoiler 30B, although not shown in the drawings. Thus, coupling between the frame 20 and the left and right spoilers 30A and 30B can be kept by coupling between the second depressions 24 of the frame 20 and the coupling maintenance protuberances 32B of the left and right spoilers 30A and 30B.

Figure 6:
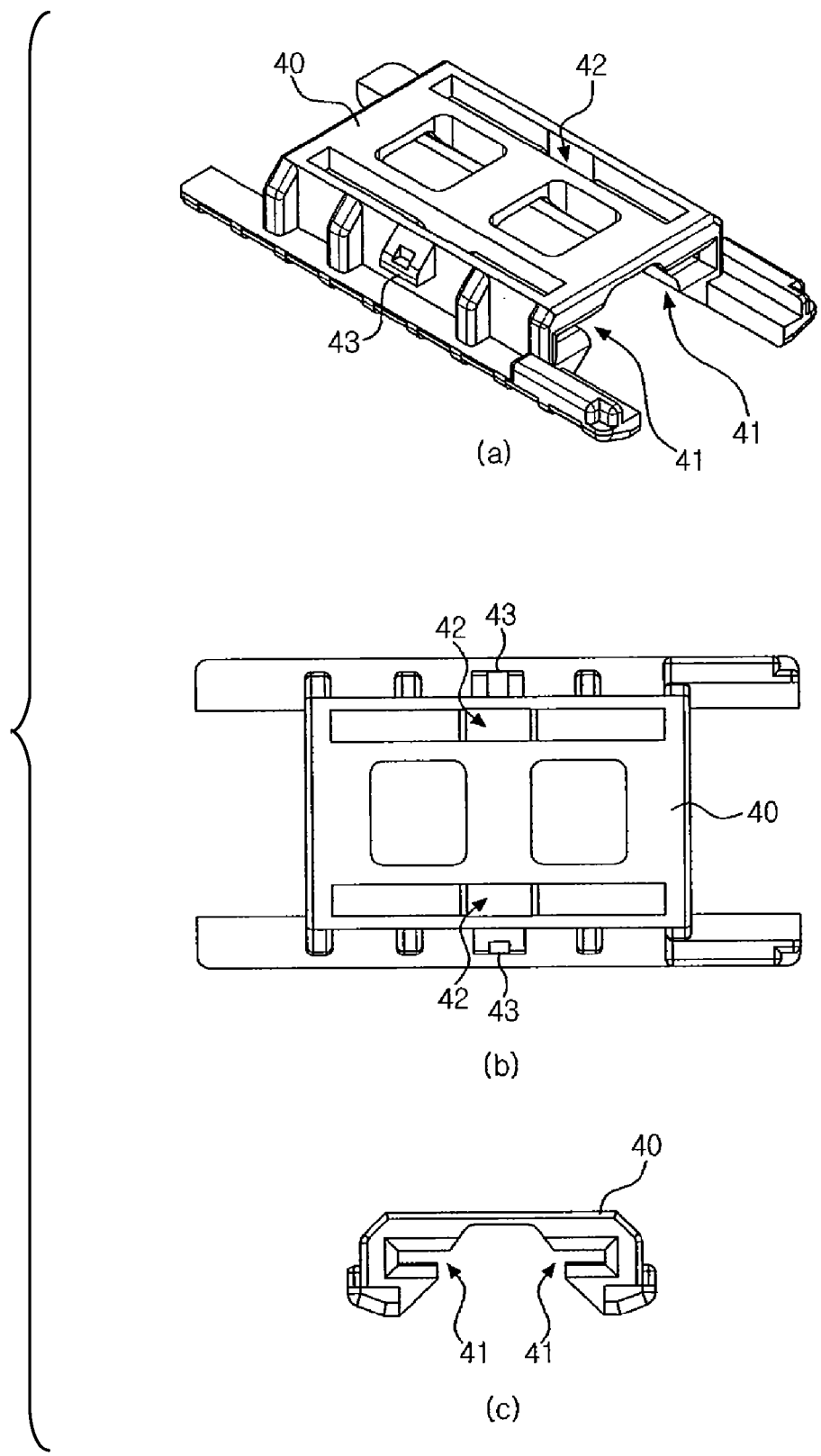
FIG. 6 illustrates a joint of the wiper blade of FIG. 2 according to one embodiment, wherein (a) is a perspective view, (b) is a plan view, and (c) is a side view of the joint.

FIG. 6 illustrates the joint 40 of the wiper blade according to one embodiment, wherein (a) is a perspective view, (b) is a plan view, and (c) is a side view of the joint.

The joint 40 is made of plastics, aluminum alloys or zinc alloys, and is disposed between the frame 20 and the bracket 50 to secure the bracket 50 to the frame 20.

Referring to FIGS. 6(a) and 6(c), the joint 40 is formed at right and left inner sides with second fitting grooves 41 into which the frame 20 is fitted. By inserting the frame 20 into the second fitting grooves 41, the joint 40 can be coupled to the frame 20.

Referring to FIGS. 6(a) and 6(b), the joint 40 has a pair of coupling holes 42 formed at a center of the joint 40 in the longitudinal direction, and a pair of protrusions 43 formed outside the coupling holes 42. The coupling holes 42 and protrusions 43 are used for coupling of the joint 40 to the bracket 50.

The joint 40 is preferably located at the center of the frame 20 (FIG. 3), and, for this purpose, the joint 40 is coupled to the bracket 50 after aligning the coupling holes 42 of the joint 40 with the first depressions 23 of the frame 20.

Figure 7:
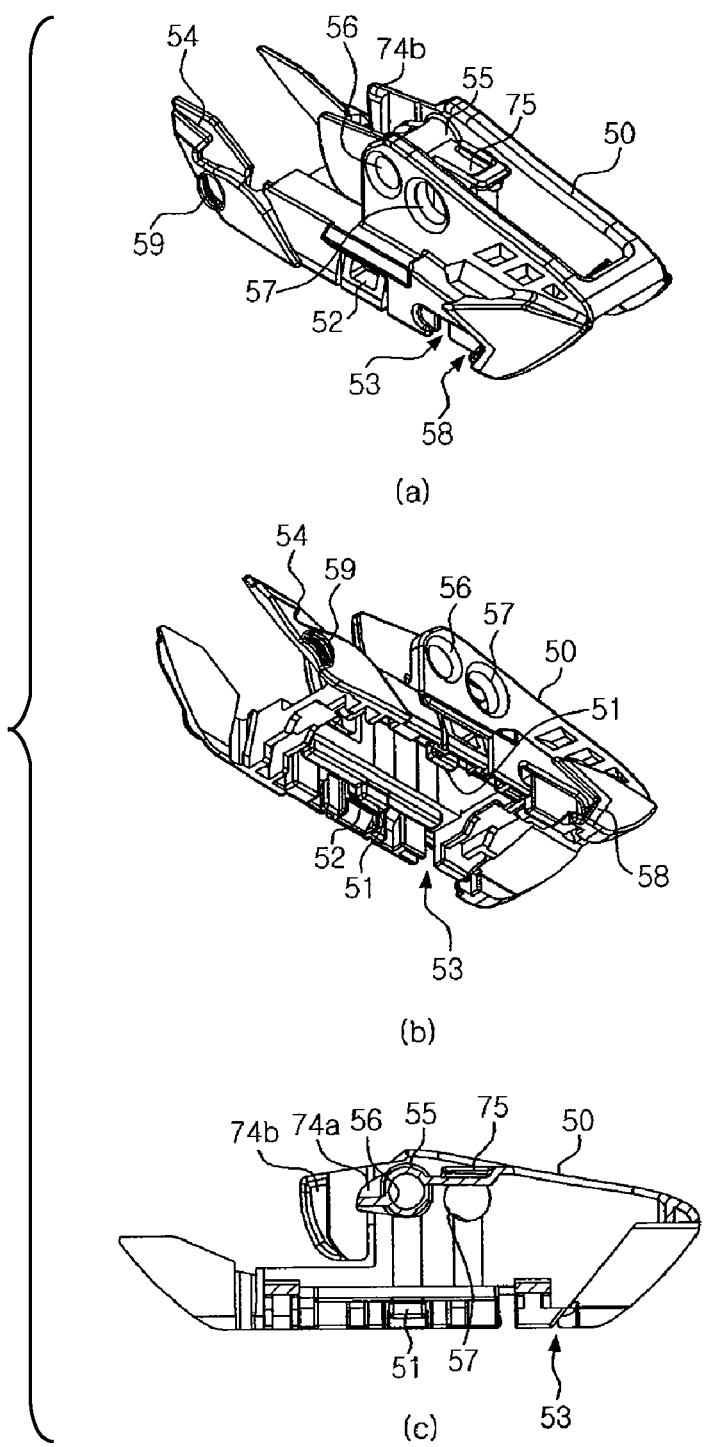
FIG. 7 illustrates a bracket of the wiper blade of FIG. 2 according to one embodiment, wherein (a) is a perspective view of the bracket seen from above, (b) is a perspective view of the bracket seen from below, and (c) is a front view of the bracket.

FIG. 7 illustrates the bracket 50 of the wiper blade according to the present invention, wherein (a) is a perspective view seen from above, (b) is a perspective view seen from below, and (c) is a front view of the bracket.

The bracket 50 may be made of plastics or the like, and is secured onto the frame 20 (FIG. 3) via the joint 40 (FIG. 6) that is previously fitted onto the center of the frame 20. Specifically, with the coupling holes 42 (FIG. 6) of the joint 40 aligned with the first depressions 23 (FIG. 4) of the frame 20, the joint 40 is coupled to the frame 20, and the bracket 50 is then secured to the frame 20 via the joint 40.

As shown in FIG. 7(b), the bracket 50 includes a pair of insertion pieces 51 disposed on right and left inner sides of the bracket 50 to simultaneously pass through the coupling holes 42 and the first depressions 23 aligned with each other, and a pair of latch holes 52, each of which is disposed near the insertion piece 51 and caught by the protrusion 43 (FIG. 6) of the joint 40.

The insertion pieces 51 are coupled to the first depressions 23 of the frame 20 through the coupling holes 42 of the joint 40. Therefore, the bracket 50 can be secured to the frame 20 by coupling between the insertion pieces 51 of the bracket 50 and the first depressions 23 through the coupling holes 42 of the joint 40, and by coupling between the protrusions 43 of the joint 40 and the latch holes 52 of the bracket 50.

Referring to FIG. 7(a), the bracket 50 has a pair of guide recesses 53 formed on right and left sides of a lower end of the bracket 50 to permit the cover 60 (FIG. 3) to be slidably and pivotably coupled to the bracket 50, and a pair of securing features 54 and a pair of latch recesses 58 to secure the cover 60 in order to maintain coupling between the cover 60 and the bracket 50.

Figure 8:
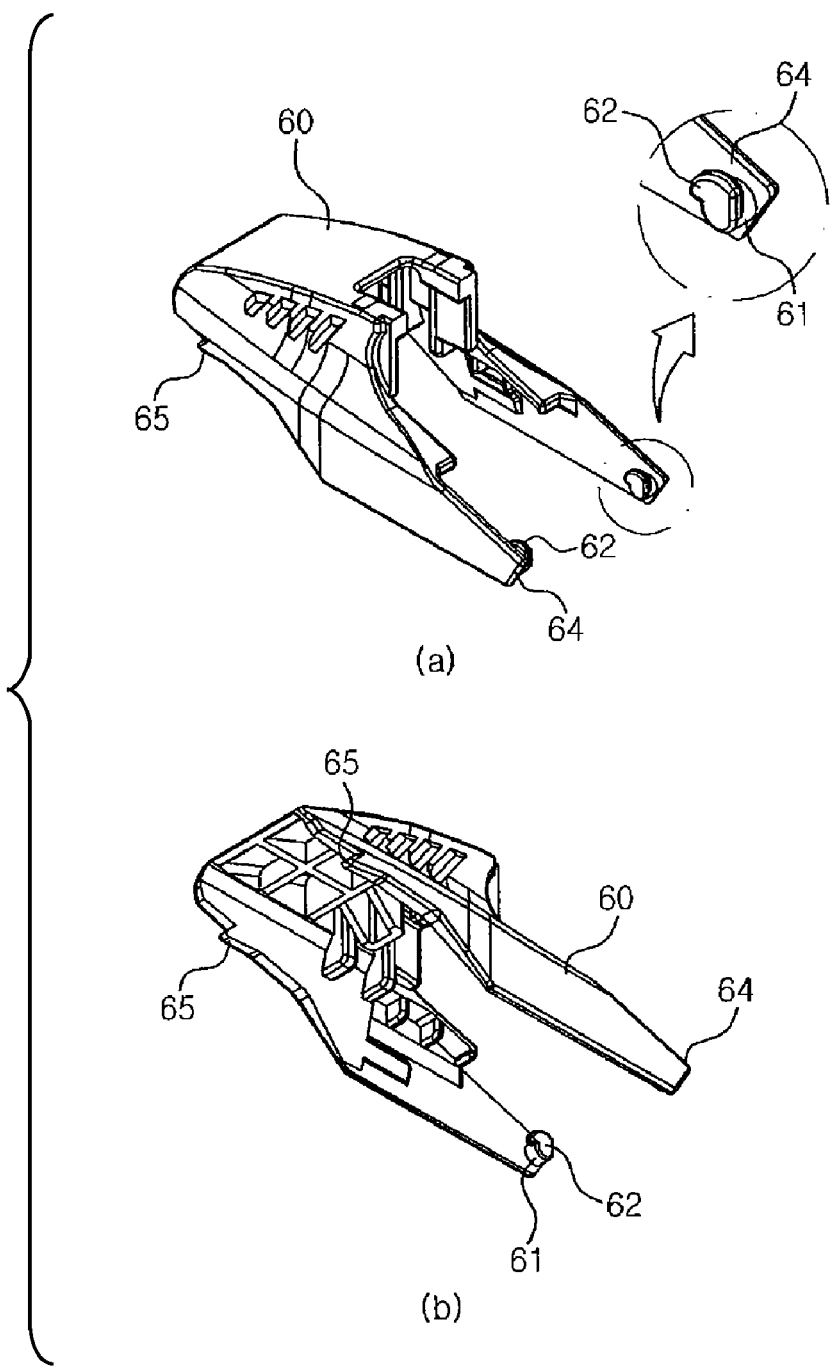
FIG. 8 illustrates a cover of the wiper blade of FIG. 2 according to one embodiment, wherein (a) is a perspective view of the cover seen from above, and (b) is a perspective view of the cover seen from below.

As illustrated in FIG. 8(a), first latch part 64 is disposed at one side of the cover 60 to be inserted into the latch recesses 58 formed at one side (right side in FIG. 7) of the bracket 50, and a second latch part 65 is disposed at the other side of the cover 60 (left side in FIG. 8) to be hooked by the securing features 54 (FIG. 7) formed at the other side of the bracket 50 in order to ensure stable coupling between the cover 60 and bracket 50.

Referring to FIGS. 7 and 8, a grip part 59 is disposed near the securing features 54 which are formed at the other side of the bracket 50. When mounting or detaching the cover 60 from the bracket 50, it is desirable that opposite ends of the bracket 50 be compressed toward each other. Accordingly, a user can easily achieve attachment and detachment of the cover 60 with respect to the bracket 50 by compressing the grip part 59 that is formed on the opposite ends at the other side of the bracket 50.

The bracket 50 has a substantially cylindrical connection part 55 that connects upper right and left sides of the bracket 50 to each other, and that is disposed such that a connection protrusion 85 of the secondary adapter 80 is caught by the cylindrical connection part 55 to allow the secondary adapter 80 to be stably coupled onto the bracket 50.

The bracket 50 is formed at left and right sides with first and second circular through-holes 56 and 57, wherein the first through-hole 56 is coaxially aligned with the connection part 55. The first and second through-holes 56 and 57 have different diameters. In this embodiment, the first through-hole 56 has a smaller diameter than that of the second through-hole 57. However, the first through-hole 56 may have a greater diameter than that of the second through-hole 57. The first through-hole 56 is configured to receive a pin type wiper arm (see FIG. 12), and the second through-hole 57 is configured to receive a side-pin type wiper arm (see FIG. 11).

Figure 10:
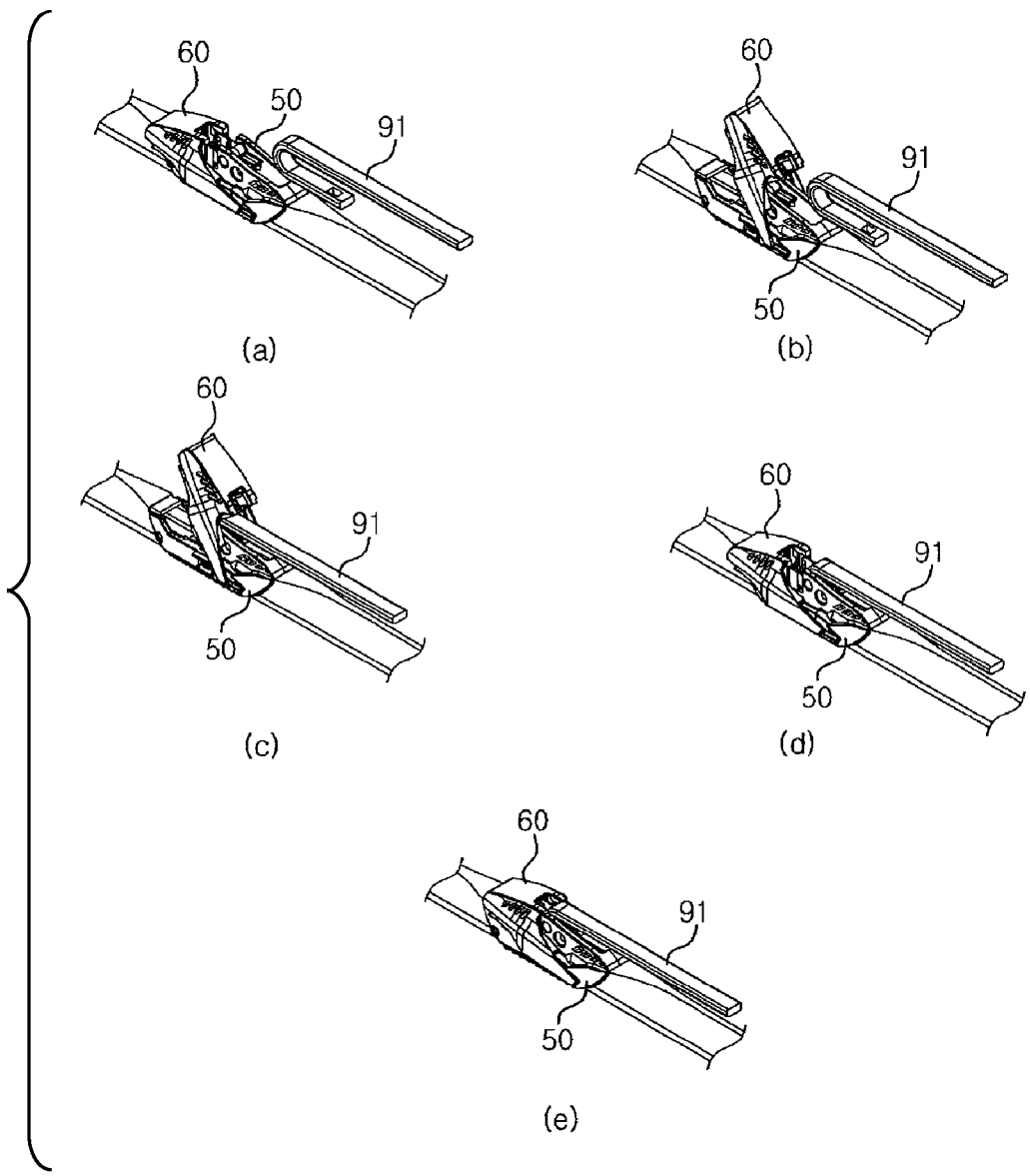
FIG. 10 illustrates a method of coupling a hook type wiper arm and the wiper blade of FIG. 2 according to one embodiment.

The bracket 50 is coupled to a hook type wiper 91 as shown in FIG. 10. For this purpose, as shown in FIGS. 7(a) and 7(c), pairs of first and second protrusions 74a and 74b are formed on the bracket 50 to face each other in order to prevent the hook type wiper 91 (FIG. 10) coupled to the bracket 50 from being separated therefrom.

Referring to FIGS. 7 and 10 coupling between the bracket 50 and the hook type wiper arm 91 is dependent on the dimensions of a hook of the wiper arm 91 as follows: when the hook type wiper arm 91 has a smaller hook, the hook of the wiper arm 91 is coupled between the connection part 55 and the first protrusions 74a, and, when the hook type wiper arm 91 has a larger hook, the hook of the wiper arm 91 is coupled between the first protrusions 74a and the second protrusions 74a, thereby preventing the hook type wiper 91 coupled to the bracket 50 from being separated therefrom.

Further, the bracket 50 is provided with a resilient lever 75 extending toward one inner side thereof (right side in FIG. 7) to prevent a side-pin type wiper arm 93 coupled to the bracket 75 from being separated therefrom.

FIG. 8 illustrates the cover 60 of the wiper blade according to one embodiment, wherein (a) is a perspective view seen from above, and (b) is a perspective view seen from below.

The cover 60 is made of plastics, and is coupled onto the bracket 50 as described above to provide a pleasant appearance of the wiper blade and to reduce resistance to wind while protecting the bracket 50 and the hook type wiper arm (see FIG. 10) coupled into the bracket 50.

Referring to FIGS. 8(a) and 8(b), the cover 60 is formed at one end with a pair of guide protrusions 61 that face each other and are respectively fitted into the guide recesses 53 (FIG. 7) of the bracket 50 (FIG. 7) to slide or rotate therein. Each of the guide protrusions 61 is formed with a latch jaw 62 to prevent rotation and separation of the guide protrusion 61 from the guide recess 53 when the guide protrusion 61 slides or linearly moves in the guide recess 53.

Further, the cover 60 is formed at a leading end of one side (right side in FIG. 8) with the first latch part 64 and at a leading end of the other side (left side in FIG. 8) with the second latch part 65 to maintain coupling between the bracket 50 and the cover 60.

Specifically, the first latch part 64 is fitted into the latch recesses 58 formed at one side (right side in FIG. 7) of the bracket 50, and the second latch part 65 receives the securing features 54 (FIG. 7) formed at the other side (left side in FIG. 7) of the bracket 60, enabling the cover 60 to be stably coupled onto the bracket 50.

Figure 9:
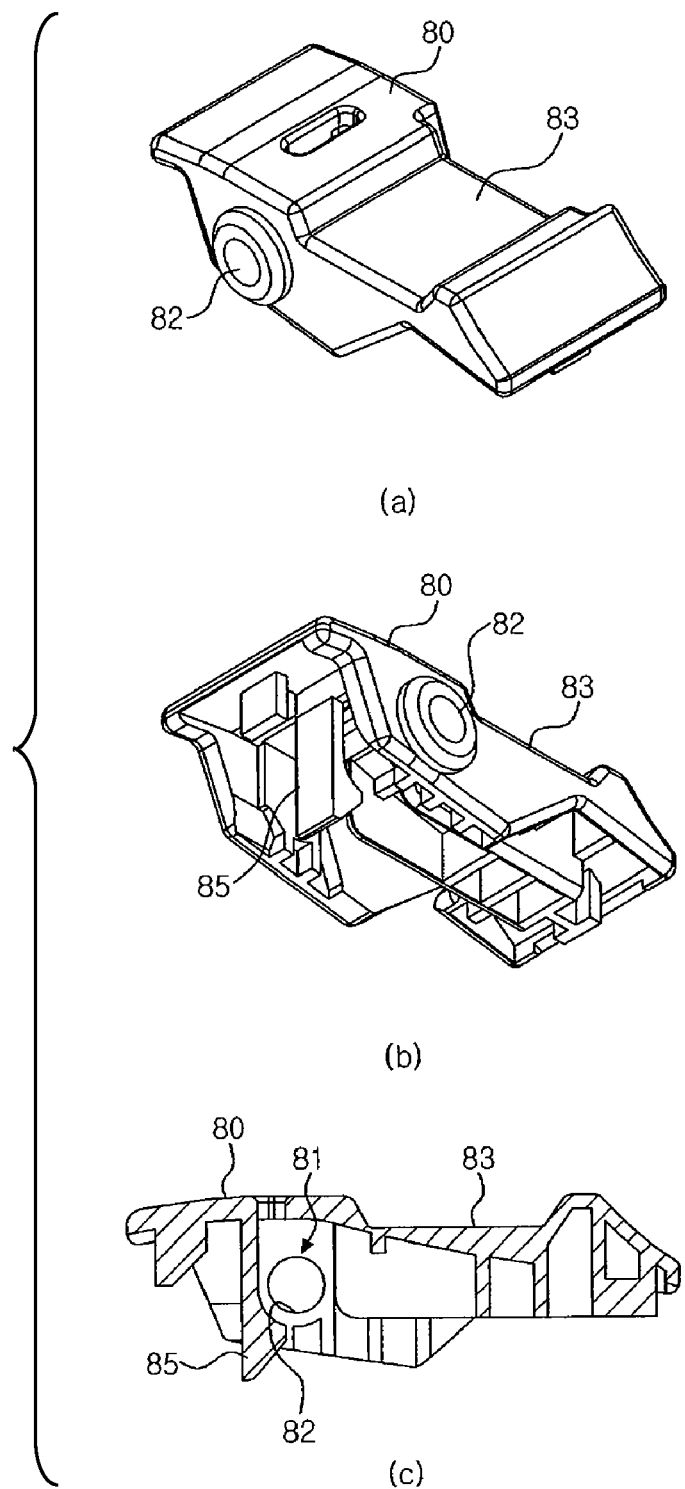
FIG. 9 illustrates a secondary adapter of the wiper blade of FIG. 2 according to one embodiment, wherein (a) is a perspective view of the secondary adapter seen from above, (b) is a perspective view of the secondary adapter seen from below, and (c) is a front view of the secondary adapter.

FIG. 9 illustrates the secondary adapter 80 of the wiper blade according to one embodiment, wherein (a) is a perspective view of the secondary adapter seen from above, (b) is a perspective view of the secondary adapter seen from below, and (c) is a front view of the secondary adapter.

Figure 12:
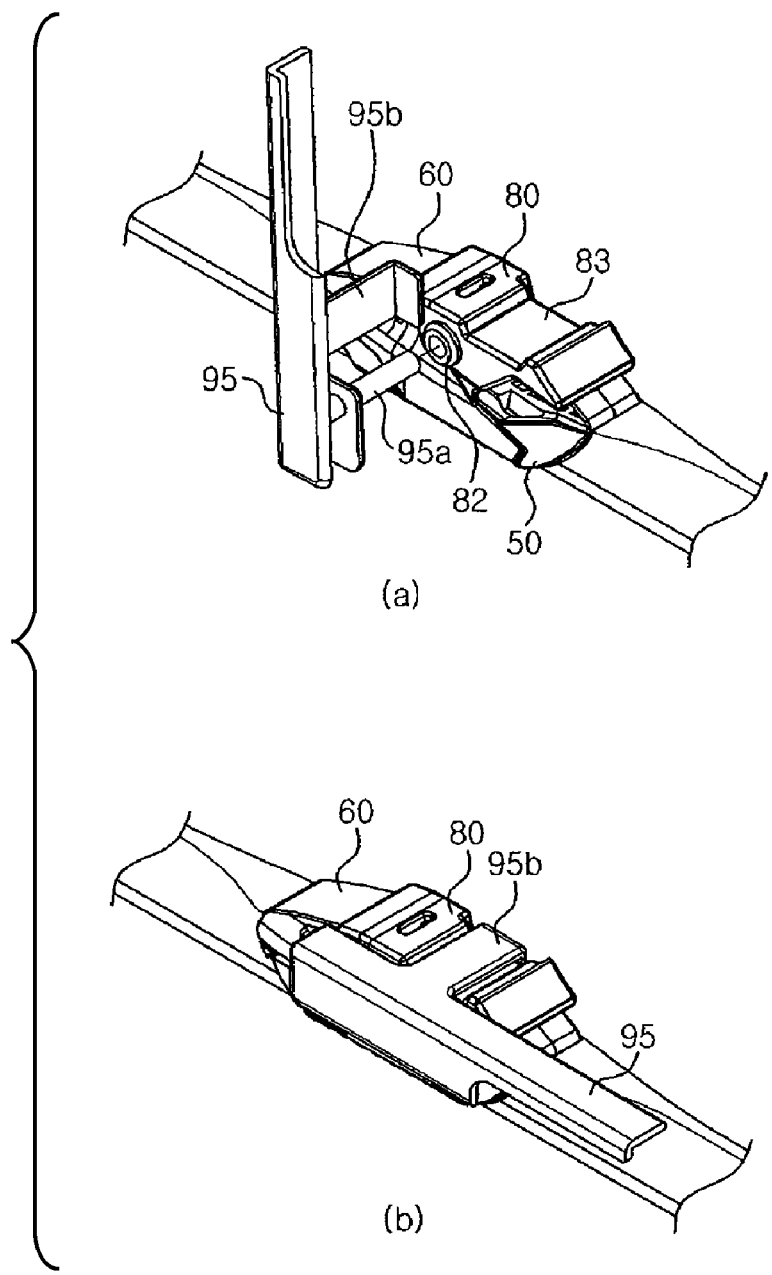
FIG. 12 illustrates a method of coupling a pin type wiper arm and the wiper blade of FIG. 2 according to one embodiment.

The secondary adapter 80 can be made of plastics, aluminum alloys or zinc alloys, and can be joined to a pin type wiper arm 95 as shown in FIG. 12.

Referring to FIGS. 7, 9(b) and 9(c), the secondary adapter 80 is formed at the center thereof with a third opening 81 into which the connection part 55 of the bracket 50 can be fitted.

Further, the secondary adapter 80 is formed at left and right sides with an insertion hole 82 into which a pin member 95a of the pin type wiper arm 95 can be inserted, and on an upper side with a seat section 83 on which a grip part 95b of the pin type wiper arm can rest.

The secondary adapter 80 has a distal end of one side (right side in FIG. 9) brought into contact with one inner side of the bracket 50 when the secondary adapter 80 is coupled to the bracket 50, and a connection protrusion 85 formed downward at the other side (left side in FIG. 9). The connection protrusion 85 is caught by the connection part 55 so that the secondary adapter 80 can be stably coupled onto the bracket 50.

Next, a method for coupling the wiper blade of one embodiment to various kinds of wiper arms will be described with reference to FIGS. 8 and 10 to 12.

FIGS. 10(a) to 10(e) illustrate coupling between the hook type wiper arm 91 and the wiper blade according to the present invention. First, with the second latch part 65 of the cover 60 released from the securing features 54 of the bracket 50, the cover 60 is slid as shown in FIG. 10(a), and is then pivoted upward as shown in FIG. 10(b).

Subsequently, a hook of the wiper arm 91 is inserted into a lower part of the cover 60, lifted as shown in FIG. 10c, and is then coupled to the bracket 50. Next, the cover 60 is pivoted and slid back to an initial coupling position as shown in FIGS. 10(d) and 10(e).

Separation of the hook type wiper arm 91 can be obtained according to a reverse sequence to the aforementioned sequence, and thus a detailed description will be omitted.

Figure 11:
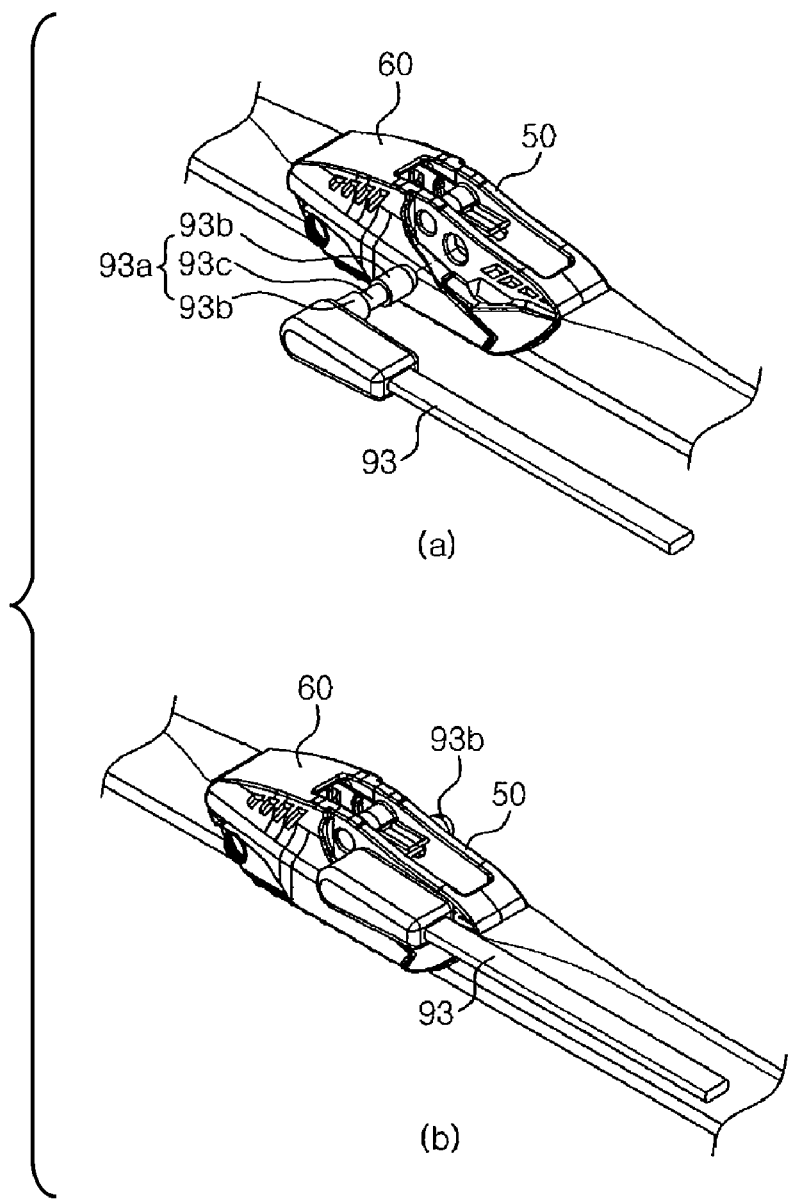
FIG. 11 illustrates a method of coupling a side-pin type wiper arm and the wiper blade of FIG. 2 according to one embodiment.

FIG. 11 illustrates a method of coupling a side-pin type wiper arm and the wiper blade according to one embodiment.

As shown in FIG. 11, a side-pin member 93a of the side-pin type wiper arm 93 includes large-diameter sections 93b formed at opposite sides, and a small-diameter section 93c formed at a central region. When inserted into the second through-hole 57, the side-pin member 93a of the side-pin type wiper arm 93 is prevented from being pulled out therefrom by means of the resilient lever 75 of the bracket 50. More specifically, the resilient lever 75 is caught by the small-diameter section 93c of the pin member 93a, allowing the side-pin type wiper arm 93 to maintain its coupling state.

FIG. 12 illustrates a method of coupling the pin type wiper arm 95 and the wiper blade according to the present invention. As shown in FIG. 12, the bracket 50 is provided with the secondary adapter 80 for coupling the bracket 50 to the pin type wiper arm 95.

The pin type wiper arm 95 includes a pin member 95a inserted into the third opening 81 through the insertion hole 82 of the secondary adapter 80 and the first through-hole 56 of the bracket 50, and a grip part 95b, one end of which is bent approximately at a right angle such that the grip part 95b can be seated on the seat section 83 formed over the upper surface of the secondary adapter 80.

In order to mount the pin type wiper arm 95 on the secondary adapter 80, the pin type wiper arm 95 is rotated as shown in FIG. 12(a), and is then moved toward the side surface of the secondary adapter 80 to insert the pin member 95a of the pin type wiper arm 95 into the insertion hole 82 of the secondary adapter 80. Then, the pin type wiper arm 95 is rotated to allow the grip part 95b thereof to be seated on the seat section 83.

As apparent from the above description, the wiper blade according to embodiments of the present invention has improved coupling structure between components of the wiper blade, thereby enabling easy assembly of the wiper blade while ensuring various kinds of wiper arm to be coupled to the wiper blade of the present invention.

Further, according to embodiments of the present invention, the wiper blade can be manufactured by assembling the respective components without a separate post-process, thereby reducing time and cost for manufacture of the wiper blade while improving productivity.

Although the exemplary embodiments have been described with reference to the accompanying drawings, it should be noted that the present invention is not limited to the embodiments and the drawings, and that various modifications and changes can be made by those skilled in the art without departing from the spirit and scope of the present invention defined by the accompanying claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A wiper blade for coupling to a wiper arm of a vehicle to wipe a glass surface of a windshield, the wiper blade comprising:
    a wiper strip;
    a frame coupled to the wiper strip, the frame including first depressions formed on a central outer periphery of the frame;
    a bracket disposed at a center of the frame and being configured to couple to the wiper arm; and
    a joint disposed between the frame and the bracket to secure the bracket to the frame, the joint including fitting grooves formed at right and left inner sides, respectively, to receive the frame inserted thereto, a pair of coupling holes formed at a center of the joint in a longitudinal direction, and a pair of protrusions formed outside the coupling holes, the bracket being coupled to the joint via the coupling holes and protrusions, the joint being located at the center of the frame by aligning the first depressions of the frame with the coupling holes and coupling the frame to the bracket, the first depressions configured to maintain coupling between the frame and the bracket.

2. The wiper blade according to claim 1, further comprising:
    a cover slidably and pivotably coupled with respect to the bracket.

3. The wiper blade according to claim 2 wherein the bracket includes guide recesses formed on right and left sides of a lower end of the bracket to permit the cover to be slidably and pivotably coupled to the bracket, a latch recess formed on a first side of the bracket, and a securing feature formed on a second side of the bracket, the latch recess and the securing feature being provided to maintain coupling between the cover and the bracket.

4. The wiper blade according to claim 3 wherein the cover includes guide protrusions formed on one end of the cover to face each other and to be respectively fitted into the guide recesses of the bracket, a latch jaw formed on a leading end of each of the guide protrusions, a first latch part formed at a first side of the cover to be inserted into the latch recess of the bracket, and a second latch part formed at a second side of the cover to be hooked by the securing feature of the bracket.

5. The wiper blade according to claim 3 wherein the bracket further includes a grip part provided near the securing feature, formed on the second side of the bracket, to allow a user to grip the bracket when mounting or detaching the cover from the bracket.

6. The wiper blade according to claim 1, further comprising:
right and left spoilers respectively coupled to right and left sides of the frame centered on the bracket to prevent the wiper blade from being detached from the glass surface when the vehicle travels.

7. The wiper blade according to claim 6 wherein the frame includes a second depression formed on an outer periphery at each end of the frame to maintain coupling between the frame and the left and right spoilers.

8. The wiper blade according to claim 7 wherein each of the left and right spoilers includes a first fitting groove formed on an inner periphery of a lower end such that the outer periphery of the frame is fitted into the first fitting groove, and a coupling maintenance protuberance formed inside one end of the first fitting groove to be inserted into the second depression at a respective end of the frame.

9. The wiper blade according to claim 1 wherein the bracket is configured to couple to a wiper arm selected from a hook type wiper arm and a side-pin type wiper arm.

10. The wiper blade according to claim 9 wherein the bracket includes pairs of first and second protrusions formed on right and left sides of the bracket and facing each other to prevent a hook type wiper arm from being separated from the bracket when coupled thereto, and a resilient lever extending toward one inner side of the bracket to prevent a side-pin type wiper arm from being separated from the bracket when coupled thereto.

11. The wiper blade according to claim 1, further comprising:
a secondary adapter coupled to the bracket which is configured to be connected to a pin type wiper arm.

12. The wiper blade according to claim 11 wherein the bracket includes a connection part connecting upper right and left sides of the bracket to each other and wherein the secondary adapter is mounted on the connection part.

13. The wiper blade according to claim 12 wherein the secondary adapter is configured to be connected to a pin type wiper arm which includes a pin member and a grip part, and wherein the secondary adapter includes a third opening formed at a center of the secondary adapter to receive the connection part of the bracket fitted into the secondary adapter, an insertion hole formed on left and right sides of the secondary adapter to receive the pin member of the pin type wiper arm, and a seat section formed on an upper side such that the grip part of the pin type wiper arm can rest on the seat section when the pin type wiper arm is connected to the secondary adapter.

14. The wiper blade according to claim 1 wherein the wiper strip includes a pair of right and left rail grooves formed along a length of the wiper strip, and the frame includes a slit formed in a longitudinal direction thereof such that the rail grooves of the wiper strip can be inserted into the slit and an insertion hole formed at one end of the slit such that an upper end of the wiper strip can pass through the insertion hole when the wiper strip is inserted into the slit.

15. The wiper blade according to claimer 1 wherein the bracket includes insertion pieces disposed on right and left inner sides of the bracket to simultaneously pass through the coupling holes and the first depressions aligned to each other, and latch holes, each being disposed outside the insertion piece and caught by the protrusion of the joint.

16. The wiper blade according to claim 1 wherein the bracket includes first and second circular through-holes formed at left and right sides and having different diameters, the first through-hole being configured to receive a pin type wiper arm including a pin member having a diameter corresponding to that of the first through-hole, and the second through-hole being configured to receive a side-pin type wiper arm having a diameter corresponding to that of the second through-hole.

17. A wiper blade for coupling to a wiper arm of a vehicle to wipe a glass surface of a windshield, the wiper blade comprising:
a wiper strip;
a frame coupled to the wiper strip;
a cover;
a bracket disposed at a center of the frame and being configured to couple to the wiper arm, the bracket including guide recesses formed on right and left sides of a lower end of the bracket to permit the cover to be slidably and pivotably coupled to the bracket, a latch recess formed on a first side of the bracket, and a securing feature formed on a second side of the bracket, the latch recess and the securing feature being provided to maintain coupling between the cover and the bracket; and
a joint disposed between the frame and the bracket to secure the bracket to the frame.

18. The wiper blade according to claim 17 wherein the cover includes guide protrusions formed on one end of the cover to face each other and to be respectively fitted into the guide recesses of the bracket, a latch jaw formed on a leading end of each of the guide protrusions, a first latch part formed at a first side of the cover to be inserted into the latch recess of the bracket, and a second latch part formed at a second side of the cover to be hooked by the securing feature of the bracket.

19. The wiper blade according to claim 17 wherein the bracket further includes a grip part provided near the securing feature, formed on the second side of the bracket, to allow a user to grip the bracket when mounting or detaching the cover from the bracket.

\* \* \* \* \*